(12) United States Patent
Fang

(10) Patent No.: US 9,898,510 B2
(45) Date of Patent: Feb. 20, 2018

(54) SEMANTIC DATA GENERATION

(71) Applicant: Empire Technology Development LLC, Wilmington, DE (US)

(72) Inventor: Jun Fang, Shanxi (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 334 days.

(21) Appl. No.: 14/434,227

(22) PCT Filed: Mar. 5, 2014

(86) PCT No.: PCT/CN2014/072896
§ 371 (c)(1),
(2) Date: Apr. 8, 2015

(87) PCT Pub. No.: WO2015/131345
PCT Pub. Date: Sep. 11, 2015

(65) Prior Publication Data
US 2016/0253323 A1  Sep. 1, 2016

(51) Int. Cl.
*G06F 17/30* (2006.01)
*G06N 5/04* (2006.01)
*G06F 17/27* (2006.01)

(52) U.S. Cl.
CPC ...... *G06F 17/3053* (2013.01); *G06F 17/2785* (2013.01); *G06F 17/30442* (2013.01); *G06F 17/30528* (2013.01); *G06N 5/04* (2013.01)

(58) Field of Classification Search
CPC .................................................. G06F 17/30861

USPC .......................................................... 707/748
See application file for complete search history.

(56) References Cited

U.S. PATENT DOCUMENTS

| | | | |
|---|---|---|---|
| 5,850,211 A | 12/1998 | Tognazzini | |
| 6,341,267 B1 | 1/2002 | Taub | |
| 7,103,848 B2 | 9/2006 | Barsness et al. | |
| 7,405,653 B2 | 7/2008 | Tice et al. | |
| 7,685,276 B2 | 3/2010 | Konig et al. | |
| 8,131,733 B2 | 3/2012 | Wang | |
| 8,438,170 B2 | 5/2013 | Koran et al. | |
| 8,868,468 B2 | 10/2014 | Peng et al. | |
| 9,361,360 B2* | 6/2016 | Fang .................. | G06F 17/3089 |
| 2006/0217818 A1 | 9/2006 | Fujiwara | |
| 2008/0155077 A1 | 6/2008 | James | |
| 2009/0035733 A1 | 2/2009 | Meitar | |

(Continued)

FOREIGN PATENT DOCUMENTS

| | | |
|---|---|---|
| CN | 102141997 A | 8/2011 |
| CN | 103500208 A | 1/2014 |
| CN | 103632579 A | 3/2014 |

OTHER PUBLICATIONS

"Endorphins," accessed at https://web.archive.org/web/20140301194452/http://en.wikipedia.org/wiki/Endorphins, modified on Mar. 1, 2014, pp. 1-7.

(Continued)

*Primary Examiner* — Baoquoc N To
(74) *Attorney, Agent, or Firm* — Brundidge & Stanger, P.C.

(57) ABSTRACT

In some examples, a computing device may be configured to simulate the deduction process of human mind by generating new data based on existing data and newly received data that is semantically relevant to the existing data.

18 Claims, 5 Drawing Sheets

(56) References Cited

U.S. PATENT DOCUMENTS

| | | | |
|---|---|---|---|
| 2010/0231504 A1 | 9/2010 | Bloem et al. | |
| 2011/0112994 A1* | 5/2011 | Goto | G06F 17/30766 706/12 |
| 2011/0119310 A1 | 5/2011 | Kolovski et al. | |
| 2011/0276396 A1 | 11/2011 | Rathod | |
| 2012/0253790 A1 | 10/2012 | Heck et al. | |
| 2012/0253930 A1 | 10/2012 | Gao et al. | |
| 2013/0004930 A1 | 1/2013 | Seronson et al. | |
| 2013/0183649 A1 | 7/2013 | Monroe et al. | |
| 2013/0226674 A1 | 8/2013 | Field et al. | |
| 2013/0260358 A1 | 10/2013 | Lorge et al. | |
| 2013/0288222 A1 | 10/2013 | Stacy et al. | |
| 2013/0309646 A1 | 11/2013 | Asano | |
| 2014/0089323 A1* | 3/2014 | Wu | G06F 17/30861 707/748 |
| 2015/0187225 A1 | 7/2015 | Worsley | |
| 2015/0261649 A1 | 9/2015 | Bohem et al. | |

OTHER PUBLICATIONS

"First-order logic," accessed at https://web.archive.org/web/20141218074028/http://en.wikipedia.org/wiki/First-order_logic, modified on Nov. 6, 2013, pp. 1-19.

"NEPOMUK—the Social Semantic Desktop," accessed at https://web.archive.org/web/20150102093322/http://neponnuk.semanticdesktop.org/files/NEPOMUK-Synopsis.pdf, accessed at Jan. 2, 2015, pp. 3.

"Online Defensive Driving Course Help Center," accessed at www.comedydriving.com/Texas-Defensive-Driving-Help-Center.php#ques2, Oct. 24, 2013, pp. 1-4.

"Ontology alignment," accessed at https://web.archive.org/web/20130512011841/http://en.wikipedia.org/wiki/Ontology_alignment, modified on Apr. 27, 2013, pp. 1-5.

"Quality of experience," accessed at https://web.archive.org/web/20140226131638/https://en.wikipedia.org/wiki/Quality_of_experience, modified on Jan. 20, 2014, pp. 1-4.

"Resolution (logic)," accessed at https://web.archive.org/web/20141102180401/http://en.wikipedia.org/wiki/Resolution_(logic), modified on Feb. 27, 2013, pp. 1-6.

Anderson J., and Schooler L. J., "Reflections of the environment in memory," Psychological Science, vol. 2, No. 6, pp. 396-408 (Nov. 1991).

Aussenac-Gilles, N., and Mothe, J., "Ontologies as Background Knowledge to Explore Document Collections," RIAO, pp. 129-142 (Sep. 2004).

Banerjee, S., and Pedersen, T., "An Adapted Lesk Algorithm for Word Sense Disambiguation Using WordNet," Computational Linguistics and Intelligent Text Processing Lecture Notes in Computer Science, vol. 2276, pp. 136-145 (Feb. 17, 2002).

Bayley, E., "The Clicks That Bind: Ways Users "Agree" to Online Terms of Service," accessed at https://www.eff.org/wp/clicks-bind-ways-users-agree-online-terms-service, posted on Nov. 16, 2009, pp. 1-4.

Berman, F., "Viewpoint: From Tera Grid to knowledge grid," Communications of the ACM, vol. 44, Issue 11, pp. 27-28 (Nov. 2001).

Bhattacharya, et al., "Quality of experience evaluation of voice communication: an affect-based approach," Human-Centric Computing and Information.Sciences, vol. 2, Issue 7, pp. 1-18 (Mar. 20, 2012).

Campbell, C. S., and Maglio, P. P., "A Robust Algorithm for Reading Detection," PUI '01 Proceedings of the 2001 workshop on Perceptive user interfaces, pp. 1-7 (Nov. 15, 2001).

Cimiano, P., "Towards the self-annotating web," Proceedings of the 13th international conference on World Wide Web, pp. 462-471, (May 17, 2004).

Deshmukh, R. R., "Ontology Mining for Personalized Web Information Gathering," International Journal of Engineering and Computer Science, vol. 1, Issue 3, pp. 121-124 (Dec. 2012).

Faatz, A., et al., "Background Knowledge, Indexing and Matching Interdependencies of Document Management and Ontology-Maintenance," ECAI Workshop on Ontology Learning'00, pp. 1-3 (Aug. 2000).

Freitag, D., and Kushmerick, N., "Boosted Wrapper Induction," Proceedings of the National Conference on Artificial Intelligence, pp. 577-583 (Sep. 2000).

Horridge, M., et al., "Explaining Inconsistencies in OWL Ontologies," Scalable Uncertainty Management Lecture Notes in Computer Science, vol. 5785, pp. 124-137 (Aug. 29, 2009).

International Search Report and Written Opinion for PCT/CN2014/072896 dated Dec. 5, 2014.

Kapoor A., and Picard, R. W., "Multimodal Affect Recognition in Learning Environments," Proceedings of the 13th annual ACM international conference on Multimedia, pp. 677-682 (Nov. 2005).

Kaya, A., and Selzer, K., "Design and Implementation of a Benchmark Testing Infrastructure for the DL System Racer," Proceedings of the KI-2004 International Workshop on Applications of Description Logics (ADL'04), pp. 1-10 (Sep. 2004).

Lassalle, J., et al., "Combination of physiological and subjective measures to assess quality of experience for audiovisual technologies," Third International Workshop on Quality of Multimedia Experience (QoMEX), pp. 13-18 (Sep. 7-9, 2011).

Leacock, C., et al., "Combining Local Context and Wordnet Similarity for Word Sense Identification," WordNet: An Electronic Lexical Database, Publisher: MIT Press, pp. 265-283 (May 1998).

Nagarajan, M., et al., "Altering Document Term Vectors for Classification—Ontologies as Expectations of Co-occurrence," WWW 2007 / Poster Paper, Semantic Web, pp. 1-10 (May 8-12, 2007).

Nakatsuji, M., et al., "Collaborative Filtering by Analyzing Dynamic User Interests Modeled by Taxonomy," Lecture Notes in Computer Science, vol. 7649, pp. 361-377 (Nov. 2012).

Nguyen, P.H.P. and Corbett, D., A basic mathematical framework for conceptual graphs, IEEE transaction on Knowledge and Data Engineering, vol. 18, Issue 2, pp. 261-271 (Feb. 2006).

Pelachaud, C., Multimodal expressive embodied conversational agents, Proceedings of the 13th annual ACM international conference on Multimedia, pp. 683-689 (Nov. 6-11, 2005).

Schewe, K., and Thalheim, B., "Semantics in Data and Knowledge Bases," Semantics in Data and Knowledge Bases, pp. 2-26 (Jul. 2008).

Schutz, A., and Buitelaar, P., "RelExt: A Tool for Relation Extraction from Text in Ontology Extension," The Semantic Web—ISWC 2005, Lecture Notes in Computer Science, vol. 3729, pp. 593-606 (Jul. 2005).

Steyvers, m., et al., Combining Background Knowledge and Learning Topics, Topics in Cognitive Science, vol. 3, Issue 1, pp. 18-47 (Jan. 2011).

Toyama, T., et al., "Wearable Reading Assist System: Augmented Reality Document Combining Document Retrieval and Eye Tracking," 12th International Conference on Document Analysis and Recognition (ICDAR), pp. 30-34 (Aug. 25-28, 2013).

Vallet, D., et al., "Personalized content retrieval in context using ontological knowledge," IEEE Transactions on Circuits and Systems for Video Technology, vol. 17, Issue 3, pp. 336-346 (Mar. 5, 2007).

Virgilio, R. D., and Orsi, G., "Semantic Data Markets: a Flexible Environment for Knowledge Management," CIKM '11 Proceedings of the 20th ACM international conference on Information and knowledge management, pp. 1559-1564 (Oct. 2011).

Zeng Z., et al., "A Survey of Affect Recognition Methods: Audio, Visual, and Spontaneous Expressions," IEEE Transactions on Pattern Analysis and Machine Intelligence, vol. 31, Issue 1, pp. 39-58 (Jan. 2009).

Zhang, H., et al., "Construction of Ontology-Based User Model for Web Personalization," Lecture Notes in Computer Science, vol. 4511, pp. 67-76 (Jul. 2007).

International Search Report and Written Opinion for International Application No. PCT/CN2014/076739 dated Dec. 30, 2014, pp. 9.

(56) References Cited

OTHER PUBLICATIONS

Rao, L., et al., "Building ontology based knowledge maps to assist business process re-engineering", Decision Support Systems, vol. 52, Issue 3, pp. 577-589 (Feb. 2012).

* cited by examiner

SEMANTIC DATA GENERATION

CROSS-REFERENCE TO RELATED APPLICATION

This application is the U.S. National Stage filing under 35 U.S.C. § 371 of International Application No. PCT/CN2014/07289, filed on Mar. 5, 2014. The disclosure of the International Application is hereby incorporated herein by reference in its entirety.

TECHNICAL FIELD

The technologies described herein pertain generally to generation of semantic formulae.

BACKGROUND

Unless otherwise indicated herein, the approaches described in this section are not prior art to the claims in this application and are not admitted to be prior art by inclusion in this section.

People may advance their knowledge regarding a given topic based on a combination of existing knowledge and newly received information. For example, a person who possesses basic knowledge of computers may identify hardware issues when he or she sees a faulted computer.

SUMMARY

Technologies are generally described for semantic data generation. The various techniques described herein may be implemented in various methods, systems, computer programmable products, and/or computer readable mediums.

In some examples, various embodiments may be implemented as methods, which may include selecting, from a first database, a first subset of one or more first semantic formulae based on weights respectively assigned thereto and a predetermined threshold weight value; selecting, from a second database, a second subset of one or more second semantic formulae that are semantically relevant to the first subset of the one or more first semantic formulae; and generating one or more third semantic formulae based on the first subset of the one or more first semantic formulae and the second subset of the one or more second semantic formulae.

In some examples, various embodiments may be implemented as systems. Some systems may include a database identifier configured to identify a first database that includes one or more first semantic formulae, each of which is assigned with one or more weights, and identify a second database that includes one or more second semantic formulae; a data selector configured to select a first subset of the one or more first semantic formulae based on the one or more weights and a predetermined threshold weight value; a semantic relevancy determination module configured to identify, from the second database, a second subset of the one or more second semantic formulae that are semantically relevant to the first subset of the one or more first semantic formulae; and a semantic formula generator configured to generate one or more third semantic formulae based on the first subset of the one or more first semantic formulae and the second subset of the one or more second semantic formulae.

In some examples, various embodiments may be implemented as computer-readable mediums having executable instructions stored thereon. Some computer-readable mediums may store instructions that, when executed, cause one or more processors to perform operations comprising identifying a first database that includes one or more first semantic formulae, each of which is assigned with one or more weights; selecting a first subset of the one or more first semantic formulae based on the one or more weights and a predetermined threshold weight value; converting the first subset of the one or more first semantic formulae into one or more first standard semantic formulae; identifying a second database that includes one or more second semantic formulae; identifying, from the second database, a second subset of the one or more second semantic formulae that are semantically relevant to the first subset of the one or more first semantic formulae; converting the second subset of the one or more second semantic formulae into one or more second standard semantic formulae; and generating one or more third semantic formulae based on the one or more first standard semantic formulae and the one or more second standard semantic formulae.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
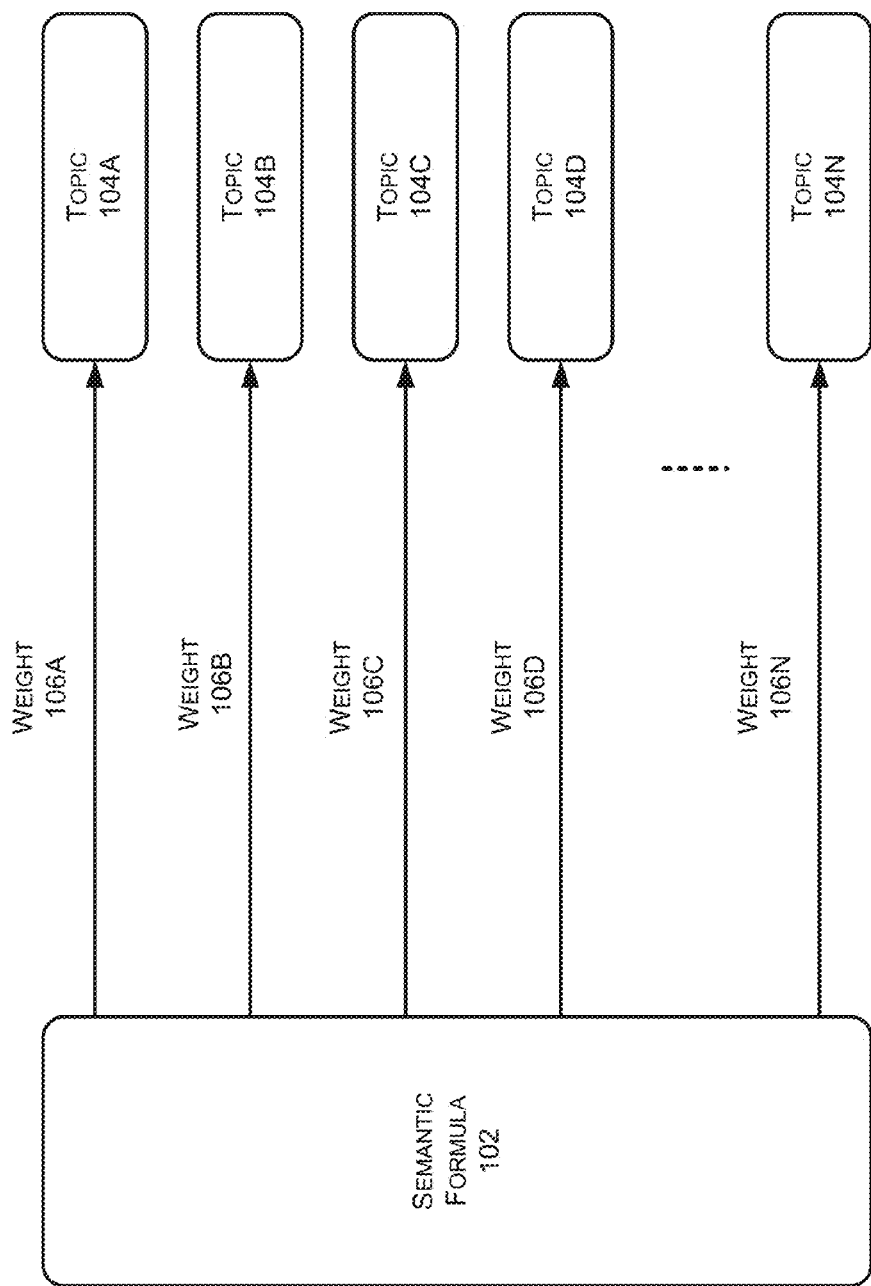
FIG. 1 shows an example semantic formula by which semantic data may be generated.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Briefly stated, in an artificial intelligence context for a given topic, semantic data generation may pertain to creating a new database that includes preexisting data enhanced by newly received data that is deemed to be semantically relevant. For example, a database of preexisting data may be exposed to newly received data, some of which may be determined to be semantically relevant. The preexisting data and the newly received semantically relevant data may then serve as a basis for expanded data, which may be attributed to a new database. The expanded data may include, for example, one or more conclusory statements relevant to the given topic.

The preexisting data and the newly received data may be formatted in accordance with one or more semantic formulae. As referenced herein, a semantic formula may refer to an arrangement of words and logic symbols, which may be used as a format for a conclusory statement.

As referenced herein, a given topic may be provided to indicate subject matter for which the user or administrator of the artificial intelligence system hopes to generate the new data. The given topic may refer to subject matter such as a field of technology, a field of industry, a field of entertainment or sports, etc.

With respect to a given topic, a semantic formula, formatted based on the preexisting data, may be assigned a weight. As referenced herein, a weight may refer to a numeric value that indicates the relevance of the semantic formula regarding the given topic. A semantic formula may be assigned one or more weights respectively corresponding to one or more given topic. The assignment of one or more weights to a semantic formula may be either objective or subjective, as described further below.

FIG. 1 shows an example semantic formula 102 by which semantic data may be generated, arranged in accordance with at least some embodiments described herein. As depicted, semantic formula 102 may be assigned one or more weights 106A, 106B, 106C, 106D, . . . 106N respectively corresponding to one or more topics 104A, 104B, 104C, 104D, . . . 104N. Weights 106A, 106B, 106C, 106D, . . . 106N are illustrated in FIG. 1 for simplicity, and one skilled in the art will appreciate that there may be a different number of weights. Similarly, topics 104A, 104B, 104C, 104D, . . . 104N are illustrated in FIG. 1 for simplicity, and one skilled in the art will appreciate that there may be a different number of topics.

Topics 104A, 104B, 104C, 104D, . . . 104N may respectively refer to different subject matter for which the user or administrator of the artificial intelligence system intends to generate the new data. In at least some examples, topics 104A, 104B, 104C, 104D, . . . 104N may respectively refer to "physics," "biology," "football," "music," etc.

Weights 106A, 106B, 106C, 106D, . . . 106N may respectively refer to different numeric values assigned to semantic formula 102. The different numeric values may respectively indicate different levels of relevance between semantic formula 102 to respective ones of topics 104A, 104B, 104C, 104D, . . . 104N.

In at least some examples, semantic formula 102 pertaining to one of topics 104A, 104B, 104C, 104D, . . . 104N may be weighted by a user or administrator of an artificial intelligence system. Semantic formula 102 may be manually weighted, based on the user's or the administrator's existing knowledge of the topic, or automatically weighted in accordance with currently existing techniques.

Semantic formula 102 may be manually weighted based upon the user's or the administrator's pre-existing knowledge of the respective words or descriptive terms or the knowledge gained by reading semantic formula 102. For example, semantic formula 102 may refer to a conclusory statement that narrates Newton's laws of motion. When the user or administrator reads through semantic formula 102, the user or administrator may assign a weight of 10 to semantic formula 102 with respect to a topic that refers to "physics" because the user or administrator considers that Newton's laws of motion are highly relevant to the topic, "physics." Regarding another topic, e.g., "biology," the user or administrator may consider that Newton's laws of motion are not relevant to biology and accordingly assign a weight of 0 to semantic formula 102.

Alternatively, semantic formula 102 may be automatically weighted in accordance with currently existing techniques. Further to the above example, a general purpose computing device may perform an algorithm to locate any keywords relevant to physics in semantic formula 102. The keywords may include "Isaac Newton," "motion," etc. A count of the keywords in semantic formula 102 may be deemed as the weight with respect to the topic, "physics."

Figure 2:
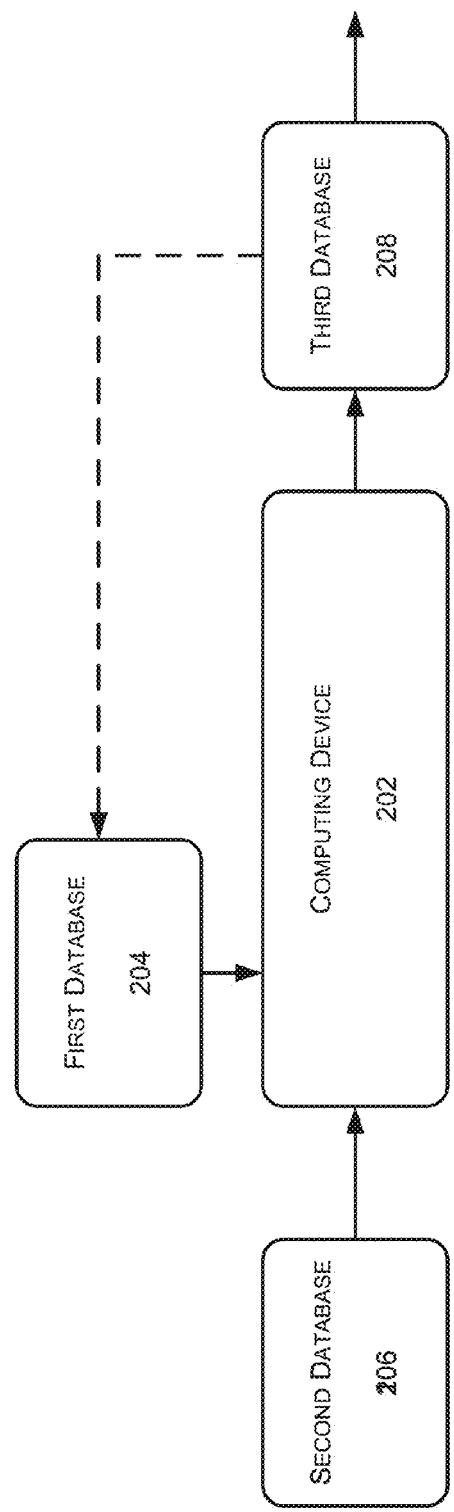
FIG. 2 shows an example system in which semantic data may be generated.

FIG. 2 shows an example system 200 in which semantic data generation may be implemented, arranged in accordance with at least some embodiments described herein. As depicted, system 200 may include, at least, a computing device 202, a first database 204, a second database 206, and a third database 208.

Computing device 202 may refer to a computing device configured to store data, receive data, and generate a new database based on semantic relevance of at least some of the received data and the existing database. Computing device 202 may include one or more hardware components, e.g., memory, central processing units (CPUs), network adapters, etc., to perform computing tasks to generate third database 208.

First database 204 may be stored in computing device 202 or a separate data storage device that is accessible to computing device 202. First database 204 may refer to a database of which at least some of the data stored therein is relevant to a given topic. In at least some examples, at least some of the data stored in first database 204 may be based on or related to scanned books, articles or news available on or retrieved from the internet, other data or information available on or retrieved from the Internet, etc. The stored data relevant to the given topic may be formatted in one or more semantic formulae in accordance with one or more semantic rules. Semantic rules are described in greater detail with regard to the description of FIG. 3. Semantic formulae stored in first database 204 may be referred to herein as "first semantic formulae". For example, one of the first semantic formulae may refer to the description: "cherry wood is a durable material."

As described above, a semantic formula may refer to an arrangement of words and logic symbols, which may be used as a format of a conclusory statement. A semantic formula may include one or more atomic formulae, which may refer to an arrangement of portions of semantic data, e.g., words or descriptive terms, upon which the conclusory statement of the semantic formula is based. Atomic formulae may be referred to as irresolvable semantic data.

Second database 206 may be stored on a remote computing device that is accessible to computing device 202, or may be generated based on data newly transmitted to and received by computing device 202. Second database 206 may refer to a database that stores the newly received data that is distinguishable from the data stored in first database 204. Similar to the data stored in first database 204, the newly received data may also be based on or related to scanned books, articles or news retrieved from the Internet, other data or information available on or retrieved from the Internet, etc.

In a similar fashion to stored data described above, newly received data may be formatted in a form of one or more semantic formulae in accordance with the semantic rules. In at least one example, second database 206 may store more semantic formulae than first database 204, e.g., contains more books and articles, etc. since, in general, the external information adds to the currently known information. Semantic formulae stored in second database 206 may be referred to herein as "second semantic formulae." Similar to first semantic formulae, the second semantic formulae may also include one or more atomic formulae. For example, one of the second semantic formulae may include the description: "a house composed by durable material is durable."

Third database 208 may refer to a database that stores the newly generated data. Third database 208 may be stored in computing device 202 or a separate data storage device that is accessible to computing device 202. In a similar fashion to the newly received data described above, the newly generated data may be also formatted in a form of one or more semantic formulae. Similarly, semantic formulae stored in third database 208 may be referred to herein as "third semantic formulae.". The third semantic formulae may be generated by computing device 202 based on the data stored in first database 204 and second database 206. Based on the aforementioned example first and second semantic formula, one of the third semantic formulae may refer to the conclusion: "a house which is composed of cherry wood is durable."

For the purpose of selecting a basis, from first database 202 and second database 204, to enable computing device 202 to generate the third semantic formulae, in at least one example, computing device 202 may be configured to identify first database 202 and select a subset of the first semantic formulae. A semantic formula may be selected as one of the subset of the first semantic formulae based on a comparison of the assigned weight of the semantic formulae with respect to the given topic and a predetermined threshold weight value. The threshold weight value may be predetermined by the user of computing device 202 or the administrator of the artificial intelligence system. If the assigned weight of the semantic formula exceeds the predetermined threshold weight value, the semantic formula may be selected as one of the subset of the first semantic formulae.

Further to the example, computing device 202 may be configured to identify second database 204 and to select a subset of the second semantic formulae that are semantically relevant to the selected subset of the first semantic formulae. The determination of semantic relevancy between semantic formulae is further described in accordance with FIG. 3 below in greater detail. Based on the subset of the first semantic formulae and the subset of the second semantic formulae, computing device 202 may be configured to generate the one or more third semantic formulae that indicate the newly generated data.

Further still to the example, since more semantic formulae may be further generated based on the newly generated third semantic formulae in combination with the first and second semantic formulae, computing device 202 may be configured to repeat the above process that begins at selecting the subset of the first semantic formulae. That is, computing device 202 may include the generated third semantic formulae in first database 104 and may be configured to re-select the subset of the first semantic formulae. Since first database 104 may then include additional semantic formulae, the subset of the second semantic formulae that are semantically relevant to the subset of the first semantic formulae may be different than the previously selected subset of the second semantic formulae. Thus, computing device 202 may generate one or more additional third semantic formulae after the reverting.

Figure 3:
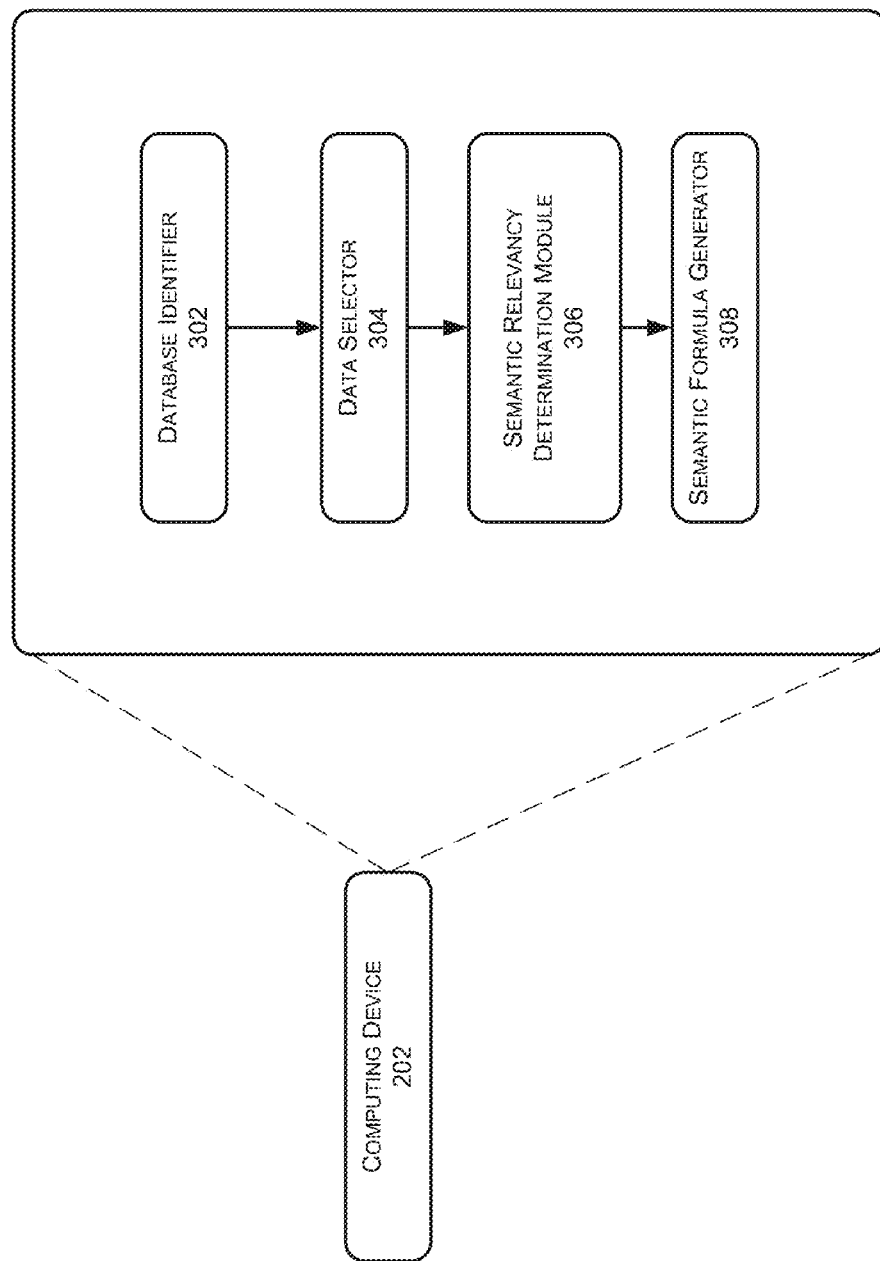
FIG. 3 shows an example configuration of a computing device by which semantic data may be generated.

FIG. 3 shows an example configuration of a computing device by which semantic data generation may be implemented, arranged in accordance with at least some embodiments described herein. As depicted, computing device 202 may include, at least, a database identifier 302, a data selector 304, a semantic relevancy determination module 306, and a semantic formula generator 308.

Database identifier 302 may refer to a component or module configured to identify first database 204 and second database 206. As described above, first database 204 may refer to a database that includes one or more first semantic formulae previously stored in computing device 202 or a data storage device that is accessible to computing device 202. Second database 206 may refer to a database that stores more semantic formulae than first database 204. Second database 206 may include one or more second semantic formulae newly received by computing device 202 from another computing device, e.g., a server, or a data source, e.g., a scanner. The semantic formulae included in first database 204 and second database 206 may each include one or more atomic formulae.

In at least one example, each of the first semantic formulae may be associated with one or more weights. Each of the weights may be manually assigned, based at least upon the understanding of a user of computing device 202, to a corresponding first semantic formula, or automatically determined, by computing device 202, in accordance with the currently existing techniques. In various example embodiments, database identifier 302 may be implemented as hardware, firmware, software, or any combination thereof.

Data selector 304 may refer to a component or module configured to select a subset of the one or more first semantic formulae. The selection may be based on the weights assigned to the corresponding first semantic formula and a predetermined threshold weight value that indicates a threshold relevance level. With respect to a topic, data selector 304 may be configured to select the subset of the first semantic formulae if the respective weights exceed the predetermined threshold weight value. In at least some examples, the threshold weight value may be predetermined by a user of computing device 202. In various example embodiments, data selector 304 may be implemented as hardware, firmware, software, or any combination thereof.

Semantic relevancy determination module 306 may refer to a component or module configured to identify, from the second database, a subset of the one or more second semantic formulae that are semantically relevant to the selected subset of the one or more first semantic formulae. Thus, semantic relevancy determination module 306 may convert the subset of the first semantic formulae and each of the second semantic formulae into fundamental forms, e.g., a form of the semantic formulae that conveys the same meaning in different format. The process of converting semantic formulae to fundamental forms is described in further detail below. As referenced herein, the fundamental forms of first semantic formulae and second semantic formulae may be referred to as "first standard semantic formulae" and "second standard semantic formulae" respectively. Based on the fundamental forms, semantic relevancy determination module 306 may then determine that a second semantic formula corresponding to a second standard semantic formula is semantically relevant to the first standard semantic formula, if an atomic formula exists in a first standard semantic formula and a negative form of the atomic formula exists in a second standard semantic formula. As referenced herein, a negative form of an atomic formula may refer to a negative form of a description such as "cherry wood is not a durable material." Based on the determination above, semantic relevancy determination module 306 may select the subset of the second semantic formulae that is semantically relevant to the subset of the first semantic formulae. In various example embodiments, semantic relevancy determination module 306 may be implemented as hardware, firmware, software, or any combination thereof.

To convert semantic formulae to the fundamental forms, in at least one example, semantic relevancy determination module 306 may be configured to repeatedly apply at least one of five basic semantic rules to the semantic formulae until the five basis semantic rules become inapplicable, i.e., no portion in the semantic formula corresponds to the left hand side of the equation that represents the basic semantic rule.

The five basic semantic rules respectively refer to: $P(x) \rightarrow Q(x) = \neg P(x) \vee Q(x)$, $\neg \exists x P(x) = \forall x \neg P(x)$, $\neg \forall x P(x) = \exists x \neg P(x)$, $\neg (P(x) \wedge Q(x)) = \neg P(x) \vee \neg \neg Q(x)$, and $\neg (P(x) \vee Q(x)) = \neg P(x) \wedge \neg \neg Q(x)$, wherein x represents subject matter of a description, $P(x)$ and $Q(x)$ respectively represent a first and a second description of the subject matter. The basic semantic rules also include known mathematic symbols, e.g., $\rightarrow$ (be), $\exists$ (exist), $\forall$ (all), $\vee$ (union), $\wedge$ (intersection), and $\neg$ (negation). With respect to a semantic formula, semantic relevancy determination module 206 may convert a portion of semantic data of the semantic formula corresponding to the left hand side of a basic semantic rule to the right hand side in order to convert the semantic formula to a fundamental form. Thus, for example, when x represents "a species of bird" and $P(x)$ represents a description of this species of bird, e.g., "eats mice," $\neg \exists x P(x)$ may represent "there is not a species of bird that eats mice" and may be converted to $\forall x \neg P(x)$ that represents "all birds don't eat mice," which has the same meaning as $\neg \exists x P(x)$.

With respect to a first standard semantic formula and a second standard semantic formula, semantic relevancy determination module 306 may determine that the second standard semantic formula is semantically relevant to the first standard semantic formula if an atomic formula is included in the first standard semantic formula and a negative form of the atomic formula is included in the second standard semantic formula. As described above, the atomic formula may refer to an arrangement of portions of semantic data, e.g., words or descriptive terms, upon which the conclusory statement of the semantic formula is based. A negative form of an atomic formula may refer to a negative form of a description such as "cherry wood is not a durable material."

In an example by which the first semantic formula refers to a description, "cherry wood is a durable material," and the second semantic formula refers to a description, "a house composed by durable materials is durable," the first semantic formula may be described in a form of $P(x)$, e.g., durable Material(cherry wood), and the second semantic formula may be described as House(x)$\wedge$ composed of (x,y)$\vee$ durable Material(y)$\rightarrow$has Characteristics(x,z)$\vee$ durability(z). Semantic relevancy determination module 306 may be configured to first convert the two semantic formulae to the fundamental forms of the two semantic formulae by applying the aforementioned five basic semantic rules. That is, the example first semantic formula may remain the same, i.e., durable Material(cherry wood), since the five rules are not applicable to the first semantic formula and the second semantic formula may be converted to $\neg$ House(x)$\vee\neg$ $\neg$ composed of (x,y)$\vee\neg$ $\neg$ durable Material(y)$\vee$ (has Characteristics(x,z)$\vee$ durability(z)) by applying the above mentioned basic semantic rules. Since durable Material is included in the first standard semantic formula as an atomic formula and the negative form of durable Material is included in the second standard semantic formula, the second semantic formula may be determined to be semantically relevant to the first semantic formula.

Semantic formula generator 308 may refer to a component or module configured to generate the one or more third semantic formulae based on the first standard semantic formulae and the second standard semantic formulae that are semantically relevant to each other. That is, with respect to a first standard semantic formula and a second standard semantic formula semantically relevant to the first standard semantic formula, semantic formula generator 308 may be configured to remove the atomic formula included in the first standard semantic formula and the negative form of the atomic formula included in the second standard semantic formula and, further, semantically combine the remaining portions of the first and second standard semantic formulae to generate a third semantic formula. As referenced herein, "remove" may refer to discarding a portion of data for purpose of generating the third semantic formulae while the data in first database 104 remains intact.

Further to the aforementioned example, durable Material may thus be removed by semantic formula generator 308 from both the first standard semantic formula and the second standard semantic formula. Semantic formula generator 308 may be configured to semantically combine the remaining portions of the first standard semantic formula and the second standard semantic formula to generate a third semantic formula:

$$\neg \text{House}(x) \vee \neg \neg \text{composed of } (x, \text{cherry wood}) \vee (\text{has Characteristics}(x,z) \wedge \text{durability}(z)),$$

which may be further converted to:

$$\text{House}(x) \wedge \text{composed of } (x, \text{cherry wood}) \rightarrow \text{has Characteristics}(x,z) \wedge \text{durability}(z)$$

meaning "a house which is composed by cherry wood is durable."

In at least one example, the third semantic formulae may be included in first database 204 and computing device 202 may revert to selecting the subset of first semantic formulae based on the modified first database 104 for the purpose of generating one or more additional third semantic formulae.

Thus, FIG. 3 shows an example computing device configured to generate one or more third semantic formulae based on the previously stored first semantic formulae and the newly received second semantic formulae.

Figure 4:
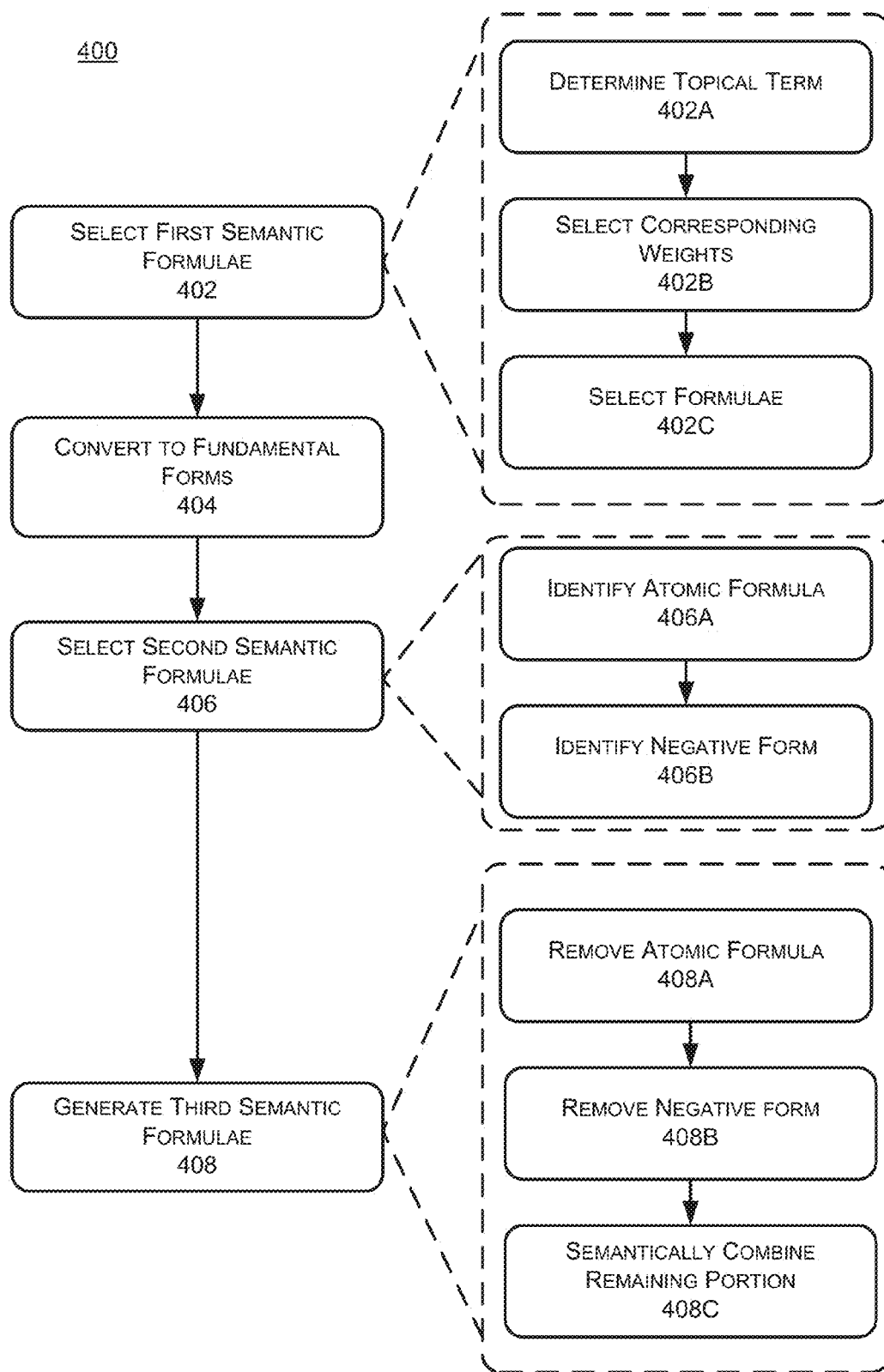
FIG. 4 shows an example processing flow of operations by which semantic data may be generated.

FIG. 4 shows an example processing flow of operations by which semantic data generation may be implemented, arranged in accordance with at least some embodiments described herein. As depicted, processing flow 400 may include sub-processes executed by various components that are part of example system 200. However, processing flow 400 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 402 (402A, 402B, and/or 402C), 404, 406 (406A and/or 406B), and/or 408 (408A, 408B, and/or 408C). Processing may begin at block 402.

Block 402 (Select First Semantic Formulae) may refer to data selector 304 selecting a subset of the first semantic formulae based on the one or more weights associated with each of the first semantic formulae and the predetermined threshold weight value. As mentioned above, the predetermined threshold weight value may indicate a threshold relevance level regarding a given topic. That is, with respect to the given topic, data selector 304 may be configured to select the subset of the first semantic formulae having corresponding weights that exceed the predetermined threshold weight value, i.e., sufficiently relevant with respect to the given topic. Block 402 may include sub-block 402A, sub-block 402B, and/or sub-block 402C and may be followed by block 404.

Sub-block 402A (Determine Topical Term) may refer to data selector 304 determining a topical term such as work, study, entertainment, etc. Since first database 204 may include a large amount of semantic formulae, determining the topical term before selecting may narrow the scope of the subset of the first semantic formulae. Sub-block 402A may be followed by sub-block 402B.

Sub-block 402B (Select Corresponding Weights) may refer to data selector 304 selecting one of the one or more weights that corresponds to the topical term. As described above, each of the first semantic formulae may be associated with one or more weights, each of which indicates a relevancy level of the corresponding first semantic formulae with respect to a topic represented by the topical term. In at least some examples, the threshold weight value may be predetermined by a user or administrator of computing device 202. Sub-block 402B may be followed by sub-block 402C.

Sub-block 402C (Select Formulae) may refer to data selector 304 selecting one or more first semantic formulae, each of which may be associated with a weight that exceeds the predetermined threshold weight value, as the subset of the first semantic formulae. Sub-block 402C may be followed by sub-block 404.

Block 404 (Convert to Fundamental Forms) may refer to semantic relevancy determination module 306 converting the selected subset of the first semantic formulae and each of the second semantic formulae into fundamental forms, e.g., first standard semantic formulae and second standard semantic formulae respectively. In at least one example, semantic relevancy determination module 306 may be configured to repeatedly apply at least one of five basic semantic rules until the five basis semantic rules become inapplicable i.e., no portion in the semantic formula corresponds to the left hand side of the equation that represents the basic semantic rule.

The five basic semantic rules include: $P(x) \rightarrow Q(x) = \neg P(x) \vee Q(x)$, $\neg \exists x P(x) = \forall x \neg P(x)$, $\neg \forall x P(x) = \exists x \neg P(x)$, $\neg (P(x) \wedge Q(x)) = \neg P(x) \vee \neg Q(x)$, and $\neg (P(x) \vee Q(x)) = \neg P(x) \wedge \neg Q(x)$, wherein x represents a subject to be described, P(x) and Q(x) respectively represent a first and a second description of the subject. Thus, for example, when x represents "a species of bird" and P(x) represents a description of this species of bird, e.g., "eats mice," $\neg \exists x P(x)$ may represent "there is not a species of bird that eats mice" and may be converted to $\forall x \neg P(x)$ that represents "all birds don't eat mice," which has the same meaning as $\neg \exists x P(x)$. Since the five basic rules become inapplicable to $\forall x \neg P(x)$, the converted form may be deemed as a standard semantic formula by semantic relevancy determination module 306. Block 404 may be followed by block 406.

Block 406 (Select Second Semantic Formulae) may refer to semantic relevancy determination module 306 selecting a subset of the second semantic formulae that is semantically relevant to the selected subset of the first semantic formulae. That is, if one atomic formula exists in a first standard semantic formula and a negative form of the atomic formula exists in a second standard semantic formula, semantic relevancy determination module 306 may be configured to determine that the second semantic formula corresponding to the second standard semantic formula is semantically relevant to the selected subset of the one or more first semantic formulae. Block 406 may include sub-block 406A and sub-block 406B and may be followed by block 408.

Sub-block 406A (Identify Atomic Formula) may refer to semantic relevancy determination module 306 identifying an atomic formula in a first standard semantic formula. For example, an atomic formula, durable Material, may be identified in the aforementioned example first standard semantic formula: durable Material(cherry wood). Such identifying may be performed in accordance with various currently existing technologies such as text searching. Sub-block 406A may be followed by sub-block 406B.

Sub-block 406B (Identify Negative Form) may refer to semantic relevancy determination module 306 identifying a negative form of the atomic formula in a second standard semantic formula. For example, with respect to the example second standard semantic formula:

$\neg \text{House}(x) \vee \neg \neg \text{ composed of }(x,y) \vee \neg \neg \text{ durable Material}(y) \vee (\text{has Characteristics}(x,z) \wedge \text{durability}(z))$ a negative form of the atomic formula, $\neg$ durable Material, may be identified by semantic relevancy determination module 206. Sub-block 406B may be followed by block 408.

Block 408 (Generate Third Semantic Formulae) may refer to semantic formula generator 308 generating the one or more third semantic formulae based on the first standard semantic formulae and the second standard semantic formulae that are semantically relevant to each other. That is, with respect to a first standard semantic formula and a second standard semantic formula semantically relevant to the first standard semantic formula, semantic formula generator 308 may be configured to remove the atomic formula included in the first standard semantic formula and the negative form of the atomic formula included in the second standard semantic formula and, further, semantically combine the remaining portion of the first and second standard semantic formulae to generate a third semantic formula. Block 408 may include sub-block 408A, 408B, and 408C.

Sub-block 408A (Remove Atomic Formula) may refer to semantic formula generator 308 removing the identified atomic formula from the first standard semantic formula. For example, the atomic formula, durable Material, may be removed from durable Material(cherry wood), yielding a remaining portion, cherry wood. Sub-block 408A may be followed by sub-block 408B.

Sub-block 408B (Remove Negative Form) may refer to semantic formula generator 308 removing the negative form of the identified atomic formula from the second standard semantic formula. For example, the negative form of the atomic formula, ¬ durable Material, may be removed from House(x)∨¬ ¬ composed of (x,y)∨¬ ¬ durable Material(y) ∨ (has Characteristics(x,z)∧ durability(z)), yielding a portion: House(x)∨¬ ¬ composed of (x,y)∨ (has Characteristics(x,z)∧ durability(z)). Sub-block 408B may be followed by sub-block 408C.

Sub-block 408C (Semantically Combine Remaining Portion) may refer to semantic formula generator 308 semantically combining the remaining portions of the first and second standard semantic formulae. For example, semantic formula generator 308 may be configured to semantically combine durable Material and House(x)∨ ¬ composed of (x,y)∨ (has Characteristics(x,z)∧ durability(z)). As a result, a third semantic formula may be generated based on the semantic combination as ¬ House(x)∨¬ ¬ composed of (x, cherry wood)∨ (has Characteristics(x,z)∧ durability(z)), which may be further converted to: House(x)^ composed of (x,cherry wood)→(has Characteristics(x,z)∧ durability(z), which means "a house which is composed by cherry wood is durable."

Thus, FIG. 4 shows an example processing flow for generating one or more third semantic formulae based on based on the previously stored first semantic formulae and the newly received second semantic formulae. That is, to simulate human deducing process in an artificial intelligence system, new conclusory statements relevant to a given topic are generated based on preexisting data enhanced by newly received data.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
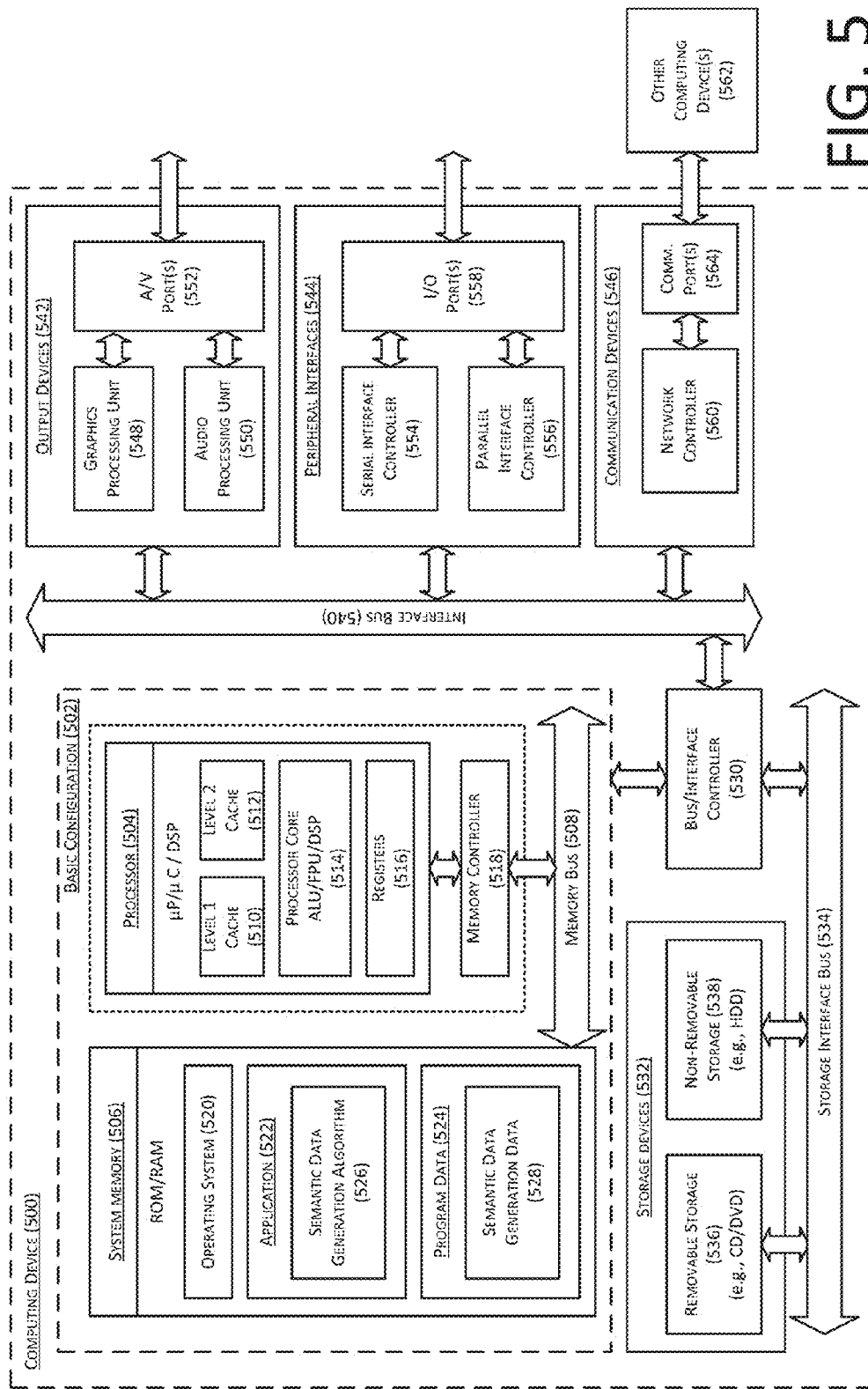
FIG. 5 shows a block diagram illustrating an example computing device that is arranged for semantic data generation, all arranged in accordance with at least some embodiments described herein.

FIG. 5 shows a block diagram illustrating an example computing device that is arranged for semantic data generation, arranged in accordance with at least some embodiments described herein.

In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include a semantic data generation algorithm 526 that is arranged to perform the functions as described herein including those described with respect to process 400 of FIG. 4. Program data 524 may include semantic data generation data 528 that may be useful for operations with semantic data generation algorithm 526 as is described herein. In some embodiments, application 522 may be arranged to operate with program data 524 on operating system 520 such that implementations of semantic data generation may be provided as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method performed by a computing device, which is communicatively coupled to a first database and a second database, for semantic data projection in an artificial intelligence system, the method comprising:

selecting, from the first database, a first subset of one or more first semantic formulae based on a comparison of respective weights of each of the one or more first semantic formulae and a predetermined threshold weight value, wherein the respective weights of each of the one or more first semantic formulae are assigned to the first subset of one or more first semantic formulae based on a particular topical term;

selecting, from the second database, a second subset of one or more second semantic formulae based on the particular topical term, wherein the second subset of the one or more second semantic formulae is semantically relevant to the first subset of the one or more first semantic formulae;

generating one or more third semantic formulae based on the first subset of the one or more first semantic formulae and the second subset of the one or more second semantic formulae, wherein the generating the one or more third semantic formulae includes generating one or more conclusions based on the first subset of the one or more first semantic formulae and the second subset of the one or more second semantic formulae, thereby enabling simulation of human deduction process in the artificial intelligence system; and reverting to the selection of the first subset of the one or more first semantic formulae when one or more conditions are not met, wherein the one or more conditions include, at least, a duration of the semantic data projection, a count of times of the reverting, or a count of the generated one or more third semantic formulae.

2. The method of claim 1, wherein each of the one or more weights indicates an importance level of the corresponding first semantic formula with respect to a topic.

3. The method of claim 1, wherein the selecting the first subset of the one or more first semantic formulae includes:

determining the particular topical term;
selecting one of the one or more weights that corresponds to the particular topical term and is greater than the predetermined threshold weight value; and
selecting one of the one or more first semantic formulae that corresponds to the selected weight as one of the first subset of the one or more first semantic formulae.

4. The method of claim 1, further comprising:
converting the first subset of the one or more first semantic formulae into one or more first standard semantic formulae; and
converting the second subset of the one or more second semantic formulae into one or more second standard semantic formulae.

5. The method of claim 4, wherein the generating comprises:
identifying a portion of irresolvable semantic data in one of the one or more first standard semantic formulae;
identifying a negative form of the portion of irresolvable semantic data in one of the one or more second standard semantic formulae;
removing the portion of irresolvable semantic data from the one of the one or more first standard semantic formulae;
removing the negative form of the portion of irresolvable semantic data from the one of the one or more second standard semantic formulae; and
semantically combining a remaining portion of the one of the one or more first standard semantic formulae and a remaining portion of the one of the one or more second standard semantic formulae.

6. The method of claim 1, further comprising including the generated one or more third semantic formulae in the first database.

7. A system, comprising:
a database identifier, implemented at least in part in hardware, configured to:
identify a first database that includes one or more first semantic formulae, each of which is assigned with one or more weights based on a particular topical term, and
identify a second database that includes one or more second semantic formulae;
a data selector, implemented at least in part in hardware and communicatively coupled to the database identifier, configured to select a first subset of the one or more first semantic formulae based on a comparison of the one or more weights and a predetermined threshold weight value;
a semantic relevancy determination module, implemented at least in part in hardware and communicatively coupled to the data selector, configured to identify, from the second database, a second subset of the one or more second semantic formulae based on the particular topical term, wherein the identified second subset of the one or more second semantic formulae is semantically relevant to the first subset of the one or more first semantic formulae;
a semantic formula generator, implemented at least in part in hardware and communicatively coupled to the semantic relevancy determination module, configured to:
generate one or more third semantic formulae based on the first subset of the one or more first semantic formulae and the second subset of the one or more second semantic formulae, wherein the generation of the one or more third semantic formulae includes generation of one or more conclusions based on the first subset of the one or more first semantic formulae and the second subset of the one or more second semantic formulae, so as to enable simulation of human deduction process in the system; and
a terminator, implemented at least in part in hardware and communicatively coupled to the data selector, configured to terminate the system when at least one or more conditions are met, wherein the one or more conditions include, at least, duration of a semantic data projection, a count of times of reverting to the selection of the first subset of the one or more first semantic formulae, or a count of the generated one or more third semantic formulae.

8. The system of claim 7, wherein each of the one or more weights indicates an importance level of the corresponding first semantic formula with respect to a topic.

9. The system of claim 7, wherein the data selector is further configured to:
determine the particular topical term;
identify one of the one or more weights that corresponds to the particular topical term and is greater than the predetermined threshold weight value; and
identify one of the one or more first semantic formulae that corresponds to the identified weight as one of the first subset of the one or more first semantic formulae.

10. The system of claim 7, further comprising a data convertor configured to:
convert the first subset of the one or more first semantic formulae into one or more first standard semantic formulae; and
convert the second subset of the one or more second semantic formulae into one or more second standard semantic formulae.

11. The system of claim 10, wherein the semantic formula generator is further configured to:
identify a portion of irresolvable semantic data in one of the one or more first standard semantic formulae;
identify a negative form of the portion of irresolvable semantic data in one of the one or more second standard semantic formulae;
remove the portion of irresolvable semantic data from the one of the one or more first standard semantic formulae;
remove the negative form of the portion of irresolvable semantic data from the one of the one or more second standard semantic formulae; and
semantically combine a remaining portion of the one of the one or more first standard semantic formulae and a remaining portion of the one of the one or more second standard semantic formulae.

12. The system of claim 7, wherein the semantic formula generator is further configured to include the generated one or more third semantic formulae in the first database.

13. A non-transitory computer-readable medium that stores executable-instructions that, when executed, cause one or more processors of a computing device, which is communicatively coupled to a first database and a second database, to perform operations comprising:
identifying the first database that includes one or more first semantic formulae, each of which is assigned with one or more weights;
selecting a first subset of the one or more first semantic formulae based on a comparison of the one or more weights and a predetermined threshold weight value;

converting the first subset of the one or more first semantic formulae into one or more first standard semantic formulae;
identifying the second database that includes one or more second semantic formulae;
identifying, from the second database, a second subset of the one or more second semantic formulae that is semantically relevant to the first subset of the one or more first semantic formulae;
converting the second subset of the one or more second semantic formulae into one or more second standard semantic formulae, wherein the identifying the second subset of the one or more second semantic formulae includes:
identifying a portion of irresolvable semantic data in one of the one or more first standard semantic formulae; and
identifying a negative form of the portion of irresolvable semantic data in one of the one or more second standard semantic formulae; and
generating one or more third semantic formulae based on the one or more first standard semantic formulae and the one or more second standard semantic formulae, wherein the generating the one or more third semantic formulae includes:
removing the portion of irresolvable semantic data from the one of the one or more first standard semantic formulae;
removing the negative form of the portion of irresolvable semantic data from the one of the one or more second standard semantic formulae; and
semantically combining a remaining portion of the one of the one or more first standard semantic formulae and a remaining portion of the one of the one or more second standard semantic formulae to generate the one or more third semantic formulae, thereby enabling simulation of human deduction process.

14. The computer-readable medium of claim 13, wherein each of the one or more weights indicates an importance level of the corresponding first semantic formula with respect to a topic.

15. The computer-readable medium of claim 13, wherein the selecting includes:
determining a first topical term;
identifying one of the one or more weights that corresponds to the first topical term and is greater than the predetermined threshold weight value; and
identifying one of the one or more first semantic formulae that corresponds to the identified weight as one of the first subset of the one or more first semantic formulae.

16. The computer-readable medium of claim 13, further comprises reverting to the selection when one or more conditions are not met, wherein the one or more conditions include, at least, a duration of a semantic data projection, a count of times of the reverting, or a count of the generated one or more third semantic formulae.

17. The computer-readable medium of claim 13, wherein the second database includes more semantic formulae than the first database.

18. The computer-readable medium of claim 13, wherein the first database includes data previously stored on the computing device and the second database includes data instantaneously collected by an input device.

* * * * *